(12) United States Patent
Matsunami et al.

(10) Patent No.: US 11,978,326 B2
(45) Date of Patent: May 7, 2024

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventors: Tatsuya Matsunami, Nisshin (JP); Atsuko Yamanaka, Toyota (JP); Kunihiro Tsunekawa, Toyota (JP); Sokfan Yee, Toyota (JP); Masahiro Tanaka, Toyota (JP); Shuichiro Takahashi, Okazaki (JP); Satoshi Nonoyama, Toyota (JP); Tokuyuki Nishikawa, Toyota (JP); Hikaru Satou, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 578 days.

(21) Appl. No.: 17/200,079

(22) Filed: Mar. 12, 2021

(65) Prior Publication Data

US 2021/0295635 A1    Sep. 23, 2021

(30) Foreign Application Priority Data

Mar. 18, 2020    (JP) ................................ 2020-048297

(51) Int. Cl.
*G07F 9/00* (2006.01)
*B60W 30/06* (2006.01)
(Continued)

(52) U.S. Cl.
CPC ............. *G07F 9/001* (2020.05); *B60W 30/06* (2013.01); *B60W 60/001* (2020.02);
(Continued)

(58) Field of Classification Search
CPC ........ G07F 9/001; G07F 9/002; B60W 30/06; B60W 60/001; G06V 20/56; H04W 4/025;
(Continued)

(56) References Cited

U.S. PATENT DOCUMENTS

| 2014/0012622 | A1* | 1/2014 | Kamiya | ............. | G06Q 30/0201 705/7.29 |
| 2014/0172509 | A1* | 6/2014 | Kamiya | ............. | G06Q 30/0205 705/7.34 |

(Continued)

FOREIGN PATENT DOCUMENTS

| CN | 108460648 A | * | 8/2018 |
| CN | 108460648 A |   | 8/2018 |

(Continued)

*Primary Examiner* — Peter D Nolan
*Assistant Examiner* — Peter Y Ning
(74) *Attorney, Agent, or Firm* — Oliff PLC

(57) ABSTRACT

The present disclosure appropriately encourages provision of a service according to a location or provision of a location according to a service. A controller of a server apparatus that is an information processing apparatus according to the present disclosure acquires, from an apparatus of a location provider, attribute information of a location that the location provider is able to provide. The controller acquires, from an apparatus of a service provider, attribute information of a service that the service provider is able to provide. The controller performs, at least one of transmission, to the apparatus of the location provider, of a notification encouraging rental of the location to the service provider and transmission, to the apparatus of the service provider, of a notification encouraging use of the location when the attribute information of the location and the attribute information of the service satisfy a predetermined condition.

18 Claims, 8 Drawing Sheets

(51) Int. Cl.
*B60W 60/00* (2020.01)
*G06V 20/56* (2022.01)
*H04W 4/02* (2018.01)
*H04W 4/40* (2018.01)

(52) U.S. Cl.
CPC ............ *G06V 20/56* (2022.01); *G07F 9/002* (2020.05); *H04W 4/025* (2013.01); *H04W 4/40* (2018.02)

(58) Field of Classification Search
CPC ... H04W 4/40; G06Q 10/0631; G06Q 20/145; G06Q 20/308; G06Q 30/0645
See application file for complete search history.

(56) References Cited

U.S. PATENT DOCUMENTS

2022/0410932 A1* 12/2022 Braunstein ............ B60W 10/30
2023/0288215 A1* 9/2023 DiCarlo ................. G08G 1/202

FOREIGN PATENT DOCUMENTS

| JP | 2002-073941 | A |   | 3/2002  |          |
|----|-------------|---|---|---------|----------|
| JP | 2002073941  | A | * | 3/2002  |          |
| JP | 2004-086548 | A |   | 3/2004  |          |
| JP | 2004086548  | A | * | 3/2004  |          |
| JP | 2017-224044 | A |   | 12/2017 |          |
| JP | 2017224044  | A | * | 12/2017 |          |
| JP | 2022061648  | A | * | 4/2022  |          |
| WO | WO-2011121486 | A1 | * | 10/2011 | ............ G06N 5/048 |
| WO | WO-2018152653 | A1 | * | 8/2018  |          |

\* cited by examiner

Fig. 5

| USER ID | LOCATION | NUMBER OF PASSERSBY | AREA SIZE | PERIPHERAL BUILDING | FACING ROAD | VIEW/ AMBIENCE | TIME SLOT | AMBIENCE/SOUND | DESIRED SERVICE | PARKING-ENABLED VEHICLE SIZE |
|---|---|---|---|---|---|---|---|---|---|---|
| A | LOCATION 1 | DAYTIME: MODERATE NIGHTTIME: FEW | 40,000 m2 OR MORE | BUILDING | MAIN STREET | | NIGHTTIME WEEKENDS AND HOLIDAYS | LOUD VOLUME ALLOWED | EVENT | LARGE |
| B | LOCATION 2 | MANY | SMALL STANDARD-SIZED VEHICLE OR SMALLER | PRIVATE HOME | ONE-LANE ROAD STANDARD-SIZE VEHICLE OR SMALLER | QUIET AREA | DAYTIME OF WEEKDAYS | QUIET | MEAL, HEALTHCARE, RETAIL | SMALL |

Fig. 6

| USER | SEIVICE | TYPE | NECESSARY AREA SIZE | MINIMUM PROVISION TIME | PROVISION TIME SLOT | CUSTOMER TYPE | SIZE | AMBIENCE /SOUND |
|---|---|---|---|---|---|---|---|---|
| ID-C | SERVICE 1 | MUSICAL PERFORMANCE | LARGE | 3 HOURS | WEEKENDS AND HOLIDAYS | | LARGE | LOUD, NO LIMIT |
| ID-D | SERVICE 2 | FOOD RETAIL | SMALL | 1 HOUR | DAYTIME | FAMILY, HOUSEWIFE | SMALL | SMALL |
| ID-E | SERVICE 3 | PET TRIMMING | SMALL | 2 HOURS | DAYTIME | | SMALL | SMALL |

INFORMATION PROCESSING APPARATUS, INFORMATION PROCESSING METHOD, AND SYSTEM

CROSS REFERENCE TO THE RELATED APPLICATION

This application claims the benefit of Japanese Patent Application No. 2020-048297, filed on Mar. 18, 2020, which is hereby incorporated by reference herein in its entirety.

BACKGROUND

Technical Field

The present disclosure relates to an information processing apparatus, an information processing method, and a system.

Description of the Related Art

Patent document 1 discloses a mobile vending method for moving and selling products by a mobile vending vehicle. According to this method, data about customers is collected in advance in relation to each of a plurality of locations where customers may be attracted, and products are sold by the mobile vending vehicle at a vending location and in a vending time slot that are determined based on the data and circumstances on the day of vending.

CITATION LIST

Patent Document

[Patent document 1] Japanese Patent Laid-Open No. 2002-073941

SUMMARY

One or more aspects of the present disclosure are directed to appropriately encourage provision of a service according to a location or provision of a location according to a service.

One aspect of an embodiment of the present disclosure may be illustrated as an information processing apparatus including a controller. The controller may be configured to execute acquiring, from an apparatus of a location provider, attribute information of a location that the location provider is able to provide, acquiring, from an apparatus of a service provider, attribute information of a service that the service provider is able to provide, and performing, at least one of transmission, to the apparatus of the location provider, of a notification encouraging rental of the location to the service provider and transmission, to the apparatus of the service provider, of a notification encouraging use of the location, when the attribute information of the location and the attribute information of the service satisfy a predetermined condition. Another aspect of the embodiment of the present disclosure may be illustrated as an information processing method that is performed by at least one computer such as the information processing apparatus or the like. Further another aspect of the embodiment of the present disclosure may be illustrated as a system including the information processing apparatus or the like.

With the present information processing apparatus, provision of a service according to a location or provision of a location according to a service may be appropriately encouraged.

BRIEF DESCRIPTION OF THE DRAWINGS

FIG. 5 is a table, according to the system in FIG. 1, illustrating an example of attribute information from a plurality of location providers;

FIG. 6 is a table, according to the system in FIG. 1, illustrating an example of attribute information from a plurality of service providers;

DESCRIPTION OF THE EMBODIMENTS

Figure 1:
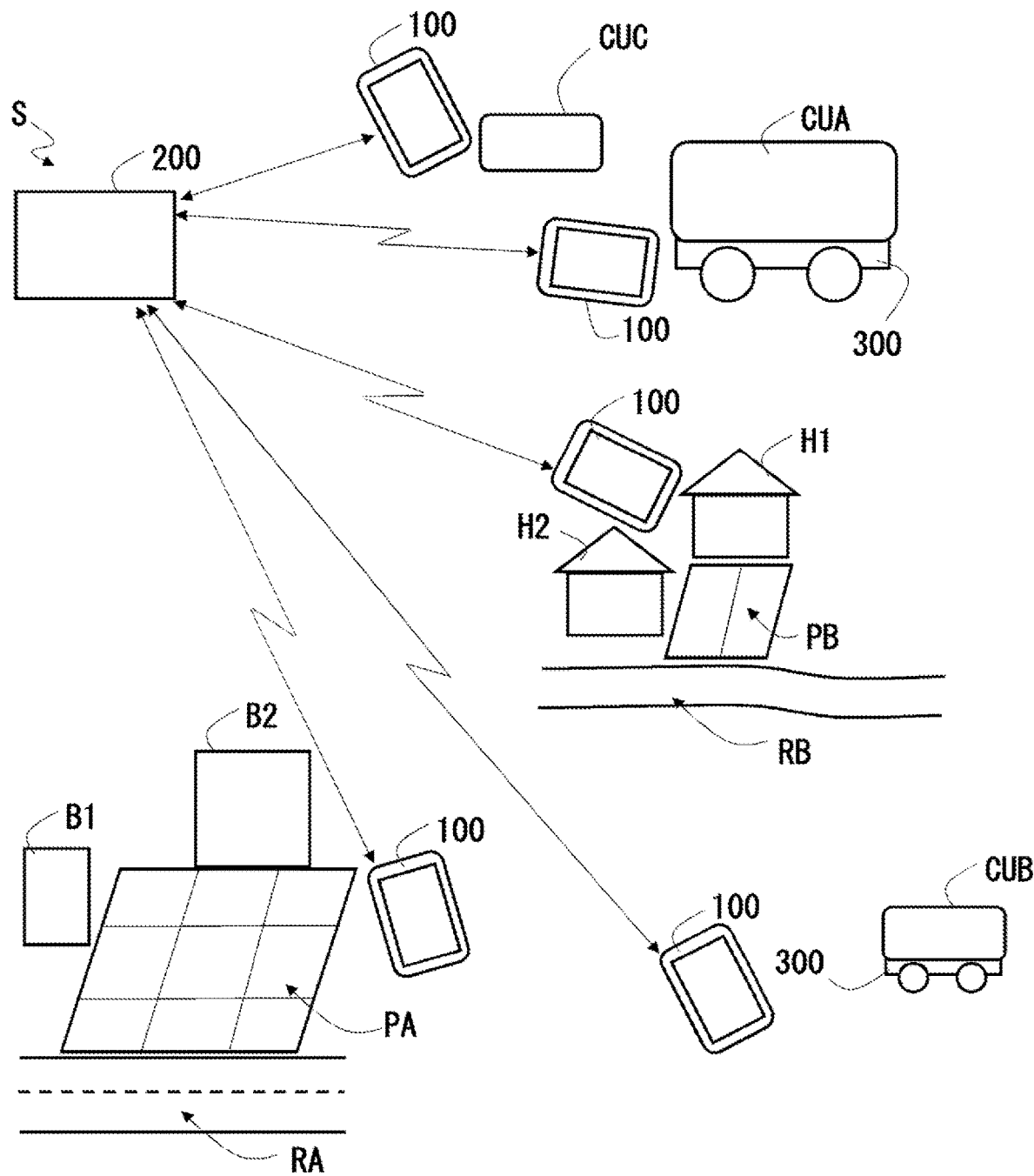
FIG. 1 is a concept diagram of a system according to an embodiment of the present disclosure.

A present embodiment may illustrate an information processing apparatus including a controller. The information processing apparatus acquires, from an apparatus of a location provider, attribute information of a location that the location provider is able to provide, acquires, from an apparatus of a service provider, attribute information of a service that the service provider is able to provide, and performs, at least one of transmission, to the apparatus of the location provider, of a notification encouraging rental of the location to the service provider and transmission, to the apparatus of the service provider, of a notification encouraging use of the location, when the attribute information of the location and the attribute information of the service satisfy a predetermined condition. Furthermore, the present embodiment may illustrate an information processing method of the controller of the information processing apparatus. Furthermore, the present embodiment may illustrate a system including the information processing apparatus.

The controller of the information processing apparatus may acquire the attribute information of the location as information of a location that the location provider is able to provide. The attribute information of the location may include information, regarding the location, about at least one of number of passersby, an area size, a peripheral building, a time slot when provision is possible, a view, and an ambience, for example, and may also include information about a type of service, provision to which is desired. Furthermore, the controller of the information processing apparatus may acquire the attribute information of the service as information about a service that the service provider is able to provide. The attribute information of the service may include information about at least one of a type of the service, an area size that is necessary to provide the service, a customer type, a minimum provision time, and a time slot when provision is possible, for example. Then, the controller determines whether or not the acquired attribute information of the location and the acquired attribute information of the service satisfy a predetermined condition. Satisfaction of a predetermined condition may be determined based on the degree of coincidence between the acquired attribute information of the location and the acquired attribute information of the service. Then, when the acquired attribute information of the location and the acquired attribute information of the service satisfy a predetermined condition, the controller may transmit, to the apparatus of the location provider (for example, a user apparatus), a notification encouraging use of the service. At this time, in addition or instead, the controller may transmit, to the apparatus of the service provider (for example, a user apparatus), a notification encouraging use of the location. According to such processes, provision of a service according to a location or provision of a location according to a service may be appropriately encouraged.

In the following, an information processing apparatus according to an embodiment of the present disclosure, an information processing method of the information processing apparatus, a program, and a system including the information processing apparatus will be described with reference to the drawings.

A system S according to the embodiment of the present disclosure includes a user apparatus 100 (100A, . . . ) and a server apparatus 200. The system S further includes a traveling unit 300 (300A, . . . ).

The user apparatus 100 is capable of communicating with the server apparatus 200 via a network N. Furthermore, in the present case, the user apparatus 100 is also capable of communicating with the traveling unit 300 via the network N. Additionally, the number of user apparatuses 100 (100A, . . . ) in the system S may be any number of one or more.

The server apparatus 200 is an information processing apparatus, and is a computer on the network N. The server apparatus 200 is capable of communicating with other server apparatuses and the like via the network N. The server apparatus 200 is capable of communicating with each user apparatus 100 via the network N. Furthermore, the server apparatus 200 is capable of communicating with each traveling unit 300, and cooperates with an information processing apparatus 302 of the traveling unit 300 via the network N. Additionally, the number of traveling units 300 (300A, . . . ) in the system S may be any number of one or more.

The traveling unit 300 is a mobile body that is capable of traveling based on an operation command from the server apparatus 200. Here, the traveling unit 300 is a type of autonomous vehicle, and is referred to also as an electric vehicle (EV) palette. The traveling unit 300 is a mobile body capable of automated driving and unmanned driving. In the system S, the traveling unit 300 may include various dimensions and various configurations. Furthermore, the traveling unit 300 does not necessarily have to be a vehicle that is capable of complete autonomous driving. For example, the traveling unit 300 may be a vehicle that is driven by a person or that supports driving, depending on the situation.

A plurality of traveling units 300 are each capable of connecting to various connection units CU (CUA, . . . ). The traveling unit 300 is capable of traveling by itself, and also allows the connection unit CU to be detachably, or in other words, separably, connected. Additionally, the traveling unit 300 may include the connection unit CU in an integrated manner not allowing separation.

In FIG. 1, the connection unit CUA as an example is placed and separably connected on an upper side of the traveling unit 300A among the traveling units 300. Furthermore, a connection unit CUB as an example is placed and separably connected on an upper side of a traveling unit 300B. Moreover, FIG. 1 illustrates a connection unit CUC in a non-connected state.

As illustrated in FIG. 1, the traveling unit 300A is larger than the traveling unit 300B. The traveling unit 300A may be classified as a large-sized vehicle, and the traveling unit 300B is classified as a standard-sized vehicle (or in other words, a vehicle in the same size range as a sedan). The connection unit CUA has a large size for a large-sized vehicle, and the connection units CUB and CUC include a small size for a standard-sized vehicle.

The connection unit CU includes an inner space and a door that connects the inner space and outside, for example, and can be used as a mobile shop or for cargo transportation, for example. Examples of a mobile shop may include a restaurant, a retail shop, a karaoke box, a health clinic and the like. The plurality of connection units CU may include various sizes and configurations, but include a same connection structure, and may be connected to various traveling units 300.

Each structural element of the system S will be described in detail below. First, description will be given of the traveling unit 300.

Figure 2:
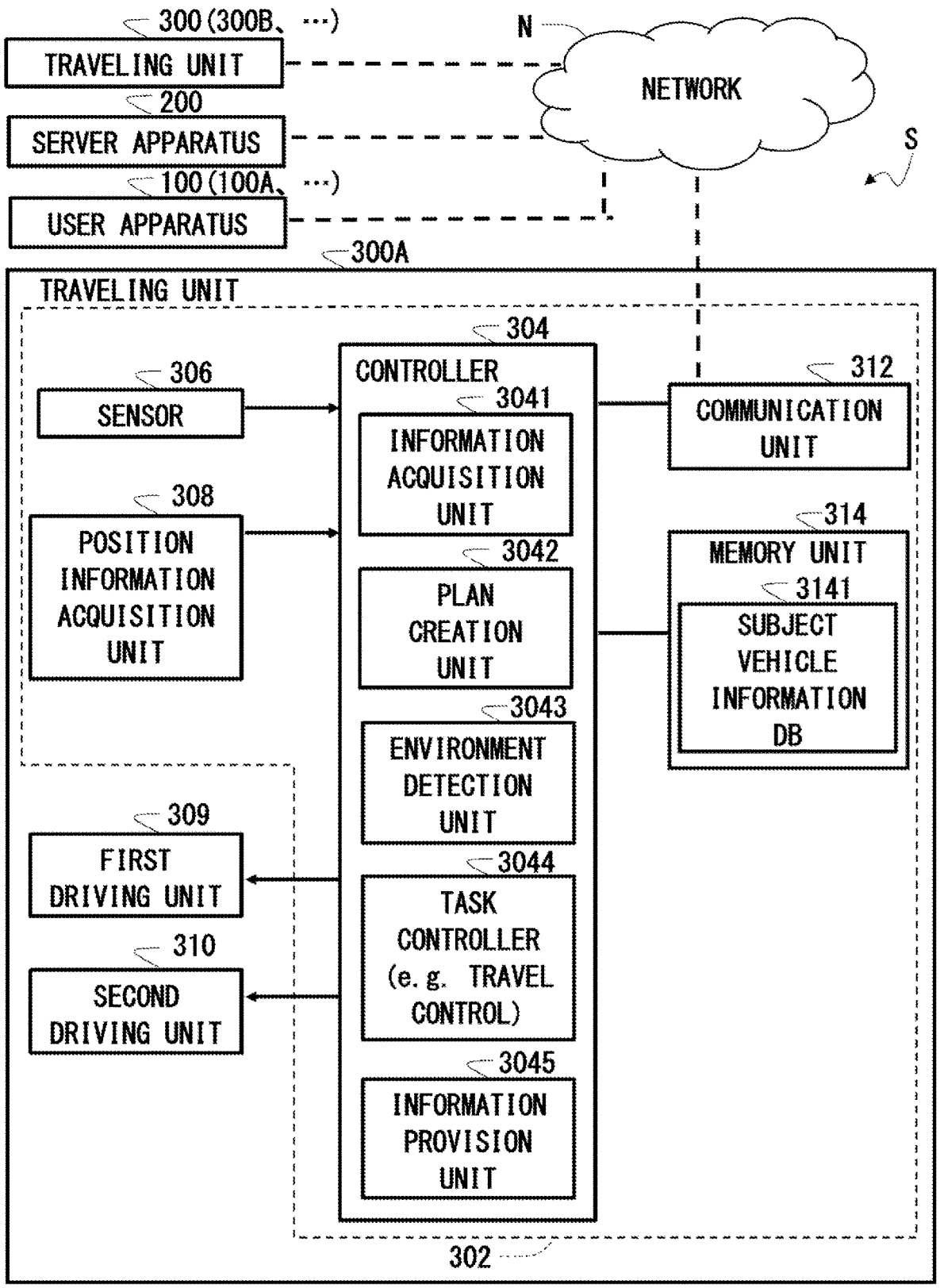
FIG. 2 is a block diagram schematically illustrating a configuration of the system in FIG. 1, the diagram illustrating a configuration of a traveling unit in particular.

FIG. 2 is a block diagram schematically illustrating a configuration of the system S including the traveling unit 300, the server apparatus 200, and the user apparatus 100, and FIG. 2 illustrates a configuration of the traveling unit 300A in particular. FIG. 2 illustrates a configuration of the traveling unit 300A as an example of the traveling unit 300, and illustrates a configuration related to a control system in particular. Other traveling units 300 (300B, . . . ) also include components described below, such as the information processing apparatus 302.

The traveling unit 300A in FIG. 2 includes the information processing apparatus 302, and includes a controller 304 that actually implements functions thereof. The traveling unit 300A is capable of traveling according to an operation command acquired from the server apparatus 200, for example. Specifically, the traveling unit 300A travels by an appropriate method while sensing surroundings of the vehicle, based on the operation command acquired via the network N.

The traveling unit 300A further includes a sensor 306, a position information acquisition unit 308, a first driving unit 309, a second driving unit 310, a communication unit 312, and a memory unit 314. The traveling unit 300A operates by power that is supplied from a battery.

The sensor 306 is a unit that performs sensing of surroundings of the vehicle, and typically includes a stereo camera, a laser scanner, Light Detection and Ranging, Laser Imaging Detection and Ranging (LIDAR), a radar or the like. Information that is acquired by the sensor 306 is transmitted to the controller 304. The sensor 306 includes a sensor for autonomous traveling of a subject vehicle. The sensor 306 includes a camera that is provided on a vehicle body of the traveling unit 300A. For example, the camera may be a capturing device that uses an image sensor such as a Charged-Coupled Device (CCD), a Metal-Oxide-Semiconductor (MOS), or a Complementary Metal-Oxide-Semiconductor (CMOS).

The position information acquisition unit 308 is a unit that acquires a current position of the traveling unit 300A. The position information acquisition unit 308 includes a Global Positioning System (GPS) receiver and the like. The GPS receiver as a satellite signal receiver receives signals from a plurality of GPS satellites. Each GPS satellite is an artificial satellite orbiting the earth. A satellite positioning system, or in other words, a Navigation Satellite System (NSS), is not limited to a GPS. Position information may be detected based on signals from various satellite positioning systems.

The NSS is not limited to a global navigation satellite system, and may include a Quasi-Zenith Satellite System, and may include "Galileo" in Europe or "Michibiki" in Japan that operates together with GPS, for example. Additionally, the position information acquisition unit 308 may include a receiver that receives radio waves from a transmitter such as a beacon, for example. In this case, a plurality of transmitters may be installed at roadsides and the like, and the transmitters may transmit radio waves at specific frequencies and/or in specific signal formats at regular intervals. Additionally, a position information detection system including the position information acquisition unit 308 is not limited to such technologies.

The controller 304 is a computer that performs control of the traveling unit 300A based on information acquired from the sensor 306, the position information acquisition unit 308 and the like. The controller 304 is an example of a controller that controls traveling of the traveling unit 300A, connection/separation operations of the connection unit CU in relation to the traveling unit, and the like.

The controller 304 includes a CPU and a main memory unit, and performs information processing according to programs. The CPU is also referred to as a processor. The main memory unit of the controller 304 is an example of a main memory. The CPU of the controller 304 executes computer programs that are executably loaded in the main memory unit, and provides various functions. The main memory unit of the controller 304 stores computer programs to be executed by the CPU and/or data, for example. The main memory unit of the controller 304 is a Dynamic Random Access Memory (DRAM), a Static Random Access Memory (SRAM), a Read Only Memory (ROM) or the like.

The controller 304 is connected to the memory unit 314. The memory unit 314 is a so-called external memory unit, is used as a memory area for supporting the main memory unit of the controller 304, and stores computer programs to be executed by the CPU of the controller 304 and/or data, for example. The memory unit 314 is a hard disk drive, a Solid State Drive (SSD), or the like.

As function modules, the controller 304 includes an information acquisition unit 3041, a plan creation unit 3042, an environment detection unit 3043, a task controller 3044, and an information provision unit 3045. Each function module is implemented by the controller 304, or more specifically, the CPU thereof, executing programs stored in the main memory unit and/or the memory unit 314.

The information acquisition unit 3041 acquires information such as an operation command including a travel plan from the server apparatus 200. The operation command may include information about connection and separation of the connection unit CU from the traveling unit 300A. Furthermore, the information acquisition unit 3041 acquires information about the subject vehicle at regular or irregular intervals, and causes the information to be stored in a subject vehicle information database 3141 in the memory unit 314.

The plan creation unit 3042 creates an operation plan for the subject vehicle based on the operation command acquired from the server apparatus 200, and based especially on information about the travel plan included in the operation command. Additionally, the operation plan created by the plan creation unit 3042 is transmitted to the task controller 3044 described later. In the present embodiment, the operation plan is data specifying a route where the traveling unit 300A is to travel, a scheduled date/time at each location on the route, and a process that the traveling unit 300A is to perform along a part of the route or along an entire route. Examples of data included in the operation plan include the following, for example.

(1) Data Expressing Route that Subject Vehicle is to Travel Using Collection of Road Links A route along which the subject vehicle is to travel may be automatically created based on a given departure point and a given destination, by referring to map data stored in the memory unit 314 and based on information about the travel plan included in the operation command, for example. The route may also be created using an external service.

(2) Data Expressing Process that Subject Vehicle is to Perform at Point on Route Processes that the subject vehicle is to perform on the route include, but are not limited to, connection and/or separation of the connection unit CU, for example.

The environment detection unit 3043 detects an environment around the vehicle based on data acquired by the sensor 306. Targets of detection are, but not limited to, the number and positions of lanes, the number and positions of vehicles existing in a periphery of the subject vehicle, the number and positions of obstacles (such as pedestrians, bicycles, structures, buildings and the like) existing in the periphery of the subject vehicle, the structure of a road, road signs and the like. Any target may be made subject to detection so long as detection thereof is necessary for autonomous traveling. Moreover, the environment detection unit 3043 may track a detected object. For example, a relative speed of an object may be determined from a difference between coordinates of the object detected in an immediately preceding step and current coordinates of the object. Data about the environment (hereinafter "environment data") detected by the environment detection unit 3043 is transmitted to the task controller 3044 described later.

The task controller 3044 controls operation of the first driving unit 309 and the second driving unit 310 of the subject vehicle based on the operation plan created by the plan creation unit 3042, the environment data created by the environment detection unit 3043, and position information of the subject vehicle acquired by the position information acquisition unit 308. For example, the task controller 3044 causes the subject vehicle to travel along a predetermined route in such a way that an obstacle does not enter a predetermined safety area around the subject vehicle. A known method may be used as the method of causing the vehicle to perform autonomous traveling. Furthermore, the task controller 3044 performs tasks related to other than traveling, based on the operation plan created by the plan creation unit 3042. As the tasks, connection and/or separation operation of the connection unit CU may be cited.

The information provision unit 3045 provides information about the subject vehicle, such as information stored in the subject vehicle information database 3141, to the server apparatus 200. Provision of information here refers to transmission of information. Provision may be performed at regular or irregular intervals.

The first driving unit 309 is a unit that causes the traveling unit 300A to travel, based on a command created by the task controller 3044. For example, the first driving unit 309 includes a motor, an inverter, a brake, a steering mechanism, a secondary battery and the like for driving wheels.

The second driving unit 310 is a unit that causes an operation of connection and/or separation of the connection unit CU to be performed, based on a command created by the task controller 3044. The second driving unit 310 may include a hydraulic mechanism or a motor for operation of a connection mechanism.

The communication unit 312 includes a communication unit for connecting the traveling unit 300A to the network N. In the present embodiment, the traveling unit 300A is capable of communicating with other apparatuses, such as the server apparatus 200, via the network N. The traveling unit 300A is also capable of communicating with the user apparatus 100 via the network N. Additionally, the communication unit 312 may further include a communication unit used by the traveling unit 300A, that is the subject vehicle, to perform inter-vehicle communication with other traveling units 300 (300B, . . . ).

Next, the server apparatus 200 will be described. The server apparatus 200 is an apparatus that provides information regarding various operation commands to each of a plurality of traveling units 300 by acquiring various pieces of information from a plurality of user apparatuses 100.

Figure 3:
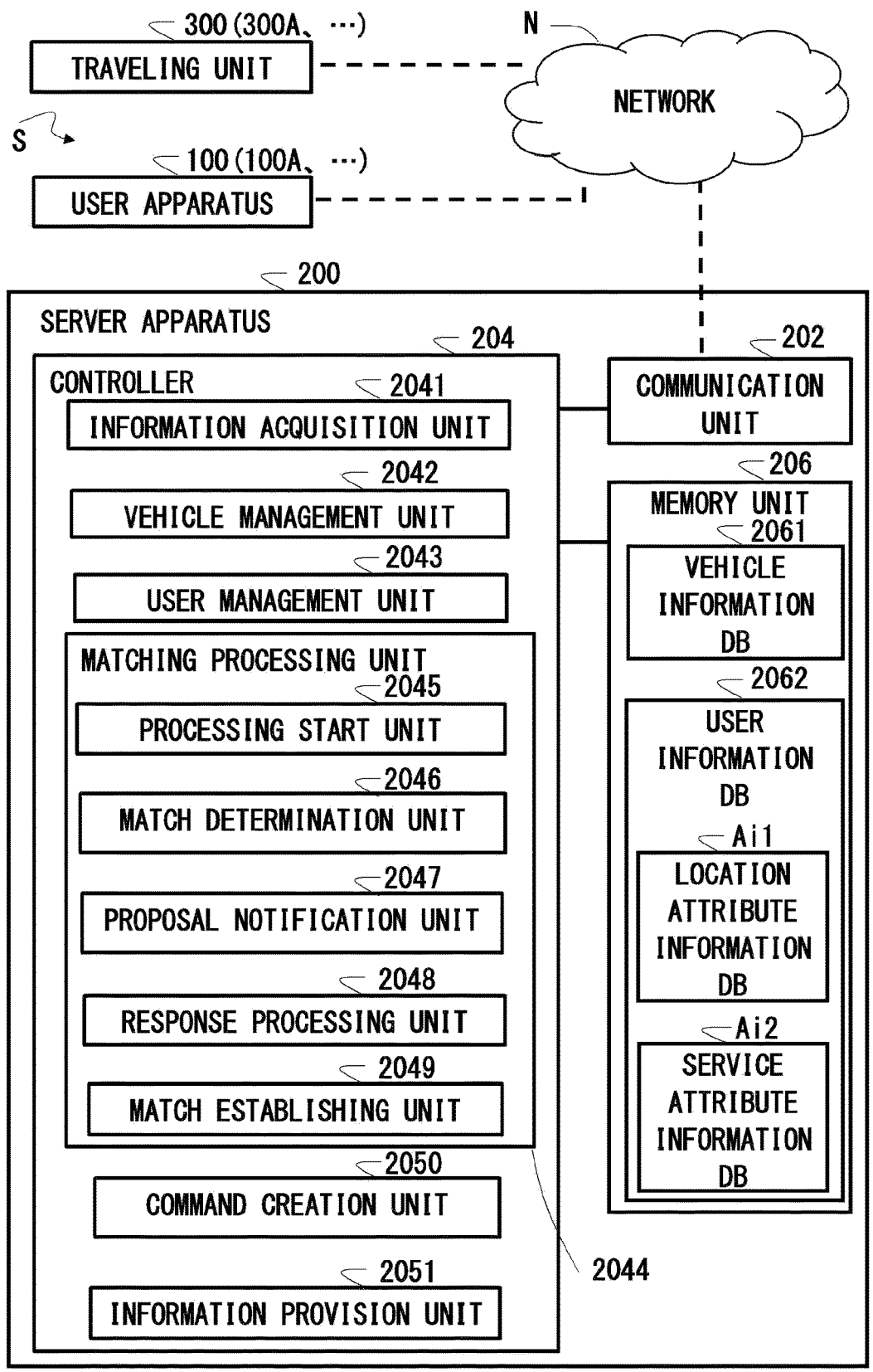
FIG. 3 is a block diagram schematically illustrating the configuration of the system in FIG. 1, the diagram illustrating a configuration of a server apparatus in particular.

The server apparatus 200 is an information processing apparatus, and includes, as illustrated in FIG. 3, a communication unit 202, a controller 204, and a memory unit 206. Like the communication unit 312, the communication unit 202 includes a communication function for connecting the server apparatus 200 to the network N. The communication unit 202 of the server apparatus 200 is a communication interface for communicating with the user apparatus 100 and the traveling unit 300 via the network N. Like the controller 304, the controller 204 includes a CPU and a main memory unit, and performs information processing according to programs. Needless to say, the CPU is also a processor, and the main memory unit of the controller 204 is also an example of a main memory. The CPU of the controller 204 executes computer programs that are executably loaded in the main memory unit, and provides various functions. The main memory unit of the controller 204 stores computer programs to be executed by the CPU and/or data, for example. The main memory unit of the controller 204 is a DRAM, an SRAM, a ROM or the like.

The controller 204 is connected to the memory unit 206. The memory unit 206 is an external memory unit, is used as a memory area for supporting the main memory unit of the controller 204, and stores computer programs to be executed by the CPU of the controller 204 and/or data, for example. The memory unit 206 is a hard disk drive, an SSD or the like.

The controller 204 is a unit that is in charge of controlling the server apparatus 200. As illustrated in FIG. 3, as function modules, the controller 204 includes an information acquisition unit 2041, a vehicle management unit 2042, a user management unit 2043, a matching processing unit 2044, a command creation unit 2050, and an information provision unit 2051. The matching processing unit 2044 includes a processing start unit 2045, a match determination unit 2046, a proposal notification unit 2047, a response processing unit 2048, and a match establishing unit 2049. Each function module is implemented by the CPU of the controller 204 executing programs stored in the main memory unit and/or the memory unit 206.

The information acquisition unit 2041 acquires various pieces of information from the user apparatus 100 and the traveling unit 300. Then, the acquired pieces of information are transmitted to the vehicle management unit 2042, the user management unit 2043, the matching processing unit 2044 and the like. The information acquisition unit 2041 acquires the position information, information in the subject vehicle information database 3141 and the like at regular intervals, for example, from the traveling unit 300, and transmits the same to the vehicle management unit 2042. Furthermore, the information acquisition unit 2041 acquires information about a plurality of registered users or information input by such users from the user apparatuses 100 associated with the users, and transmits the same to the user management unit 2043. Moreover, in a case of issuing a notification to the user apparatus 100 in relation to a process by the system S and acquiring a response to such a notification, the information acquisition unit 2041 transmits the response to the matching processing unit 2044.

The vehicle management unit 2042 manages information about a plurality of traveling units 300 under its management. Specifically, the vehicle management unit 2042 receives, from a plurality of traveling units 300, via the information acquisition unit 2041, information such as data about the traveling units 300, and causes the information to be stored in the vehicle information database 2061 in the memory unit 206. The position information and vehicle information are used as information about the traveling unit 300. For example, the vehicle information is an identifier, usage/type, information about a standby location, a travelable range, a current status and the like of the traveling unit 300. Furthermore, the vehicle management unit 2042 also causes position information and unit information of the connection unit CU to be stored in the vehicle information database 2061 in the memory unit 206. Information about a position of connection and/or separation from the traveling unit 300 may be used as the position information of the connection unit CU. The unit information of the connection unit CU may include, in addition to a size, a seating capacity and the like, information about an intended purpose such as usage as a shop.

The user management unit 2043 stores information about a user in a user information database 2062 in the memory unit 206. When information from a user (such as the attribute information of a location that can be provided and/or the attribute information of a service that can be provided) is acquired via the information acquisition unit 2041, the user management unit 2043 stores the information in the user information database 2062. The user information database 2062 stores user information. The user information includes identification information unique to the user (such as a user ID, contact information and the like). Moreover, the user information database 2062 stores, in association with the identification information of the user, the attribute information of a location that can be provided and the attribute information of a service that can be provided. In this case, a part of the user information database 2062 is an attribute information database Ai1 for locations collecting pieces of attribute information of locations, and another part of the user information database 2062 is an attribute information database Ai2 for services collecting pieces of attribute information of services. Additionally, the attribute information database Ai1 for locations and/or the attribute information database Ai2 for services may be provided separately from the user information databases 2062.

The following processes may be cited as processes to be performed by the matching processing unit 2044. As described above, the controller 204 acquires, from the user apparatus 100 of a user who provides a location (a location provider), the attribute information of the location that the location provider is able to provide. Furthermore, the controller 204 acquires, from the user apparatus 100 of a user who provides a service (a service provider), the attribute information of the service that the service provider is able to provide. When the attribute information of the location and the attribute information of the service satisfy a predetermined condition, the matching processing unit 2044 of the controller 204 transmits a notification to the user apparatus 100 of one or both of the location provider and the service provider to encourage use of the location or the service. As a matching process, the matching processing unit 2044 performs up to an establishing process for match, or in other words, conformity, but the matching processing unit 2044 may also perform up to a process by the proposal notification unit 2047 described later.

The processing start unit 2045 of the matching processing unit 2044 may operate at regular or irregular intervals, or may operate when a request for a matching process is acquired from a user. For example, when a request for a matching process is acquired from a user, the processing start unit 2045 accordingly causes the match determination unit 2046 to operate.

The match determination unit 2046 of the matching processing unit 2044 determines whether or not the attribute information of a location and the attribute information of a service satisfy a predetermined condition. For example, the match determination unit 2046 refers to definition information defining a degree of coincidence between the attribute information of a location and the attribute information of a service, for each combination of the attribute information of a location and the attribute information of a service. Then, the match determination unit 2046 evaluates the degree of coincidence or the degree of match between the pieces of attribute information in scores, and evaluates a combination of the location and the service based on a total of the scores. Firstly, the predetermined condition is that the degree of coincidence is at or greater than a predetermined level, and thus, the match determination unit 2046 outputs a combination for which the degree of coincidence is at or greater than a predetermined level as a determination result. Additionally, in the case where there is a plurality of combinations for which the degree of coincidence is at or greater than a predetermined level, the match determination unit 2046 may output a combination with the highest degree of coincidence as the combination that satisfies the predetermined condition. Preference of users, service use history of the users and the like may be used in the determination.

The proposal notification unit 2047 of the matching processing unit 2044 issues a notification encouraging use of the location or the service to the user apparatus 100 of a corresponding user, based on the output, or in other words, the determination result, from the match determination unit 2046. The notification is issued to the user apparatus 100 of one or both of the users of the combination of the location and the service related to the output from the match determination unit 2046. Specifically, when the attribute information of the location and the attribute information of the service satisfy the predetermined condition, the proposal notification unit 2047 may transmit a notification encouraging use of the service to the user apparatus 100 of the location provider of the combination. Furthermore, when the attribute information of the location and the attribute information of the service satisfy the predetermined condition, the proposal notification unit 2047 may transmit a notification encouraging use of the location to the user apparatus 100 of the service provider of the combination. The user information in the user information database 2062 is referred to at the time of notification.

The response processing unit 2048 of the matching processing unit 2044 processes a response from the user apparatus 100 to the notification by the proposal notification unit 2047. For example, when a positive response for encouragement of use is acquired as a response to the notification, from the user apparatus 100 of one of the location provider and the service provider, the response processing unit 2048 issues a further notification to the user apparatus 100 of the other of the location provider and the service provider. In response to a request regarding the combination for which there is the positive response, the response processing unit 2048 transmits, as the further notification, to the other user apparatus, a notification encouraging use of the location or the service of the combination.

For example, description will be given of a case where the match determination unit 2046 operates based on a request from a user who is a service provider. At this time, when there is a location of attribute intonation that satisfies the predetermined condition with the attribute information of the service that is provided by the service provider, the match determination unit 2046 outputs the combination. In response, the proposal notification unit 2047 transmits, to the user apparatus 100 of the user who is the service provider, a notification encouraging use of the location of the combination. Then, when a positive response is acquired from the user apparatus 100 of the user who is the service provider, the response processing unit 2048 transmits the further notification described above, assuming that there is a request for combination of the location with the service that is provided by the user who is the service provider. This further notification is, in this case, a notification encouraging use of the service that is issued to the user apparatus 100 of the user who is the location provider providing the location of the combination. The same can be said for a case where the match determination unit 2046 operates based on a request from a user who is a location provider.

Then, the match establishing unit 2049 of the matching processing unit 2044 acquires a response from the user apparatus 100 of the location provider and a response from the user apparatus 100 of the service provider. Then, the match establishing unit 2049 establishes that the combination of the location that can be provided by the location provider and the service that can be provided by the service provider is fixed. Here, according to the establishment, the match establishing unit 2049 refers to the vehicle information database 2061, selects the traveling unit 300 and the connection unit that match the established content of the service, and transmits the information to the command creation unit 2050. Furthermore, the match establishing unit 2049 transmits a notification of establishment to both the user apparatus 100 of the location provider and the user apparatus 100 of the service provider. Additionally, the notification of establishment may include a price such as an amount of cost to be paid by the service provider to the location provider. In this case, the amount of cost may be a predetermined proportion of an amount of money that the service provider can obtain by providing the service.

The command creation unit 2050 creates an operation command including a travel plan of the traveling unit 300, based on match establishment by the match establishing unit 2049 of the matching processing unit 2044. Here, an operation command including a travel plan of a traveling unit 300 to which the connection unit CU matching the service to be provided by the service provider is connected or is scheduled to be connected is created. The created travel plan may include a destination and/or a destination arrival time, for example.

The information provision unit 2051 provides, or in other words, transmits, the operation command including the travel plan created by the command creation unit 2050 to a predetermined traveling unit 300. The vehicle information database 2061 is referred to at the time of transmission to the traveling unit 300. Furthermore, the information provision unit 2051 provides, to the user apparatus 100 of the user, a travel schedule of the traveling unit 300 and/or arrangement of the connection unit CU, for example. The user information database 2062 is referred to at the time of provision of the information to the user apparatus 100.

Next, description will be given of the user apparatus 100. For example, the user apparatus 100 is a mobile terminal, a smartphone, a personal computer or the like. A user apparatus 100A in FIG. 4, as an example, includes a communication unit 102, a controller 104, and a memory unit 106. The communication unit 102 and the memory unit 106 of the user apparatus 100A are the same as the communication unit 202 and the memory unit 206 of the server apparatus 200. The user apparatus 100A further includes a display unit 108, an operation unit 110, and a position information acquisition unit 111. The display unit 108 is a liquid crystal display, an electroluminescent panel or the like, for example. The operation unit 110 may be a keyboard, a pointing device or the like, for example. More specifically, in the present embodiment, the operation unit 110 includes a touch panel, and is substantially integrated with the display unit 108. The position information acquisition unit 111 is configured in the same manner as the position information acquisition unit 308, and transmits the position information to the controller 104.

Like the controller 204 of the server apparatus 200, the controller 104 includes a CPU and a main memory unit. The CPU of the controller 104 executes an application program (application) 1061 stored in the memory unit 106. The application 1061 is an application program for accessing a web browser or information that is delivered from the server apparatus 200. The application 1061 includes a GUI, receives an input from a user, and transmits the input to the server apparatus 200 via the network N.

Figure 4:
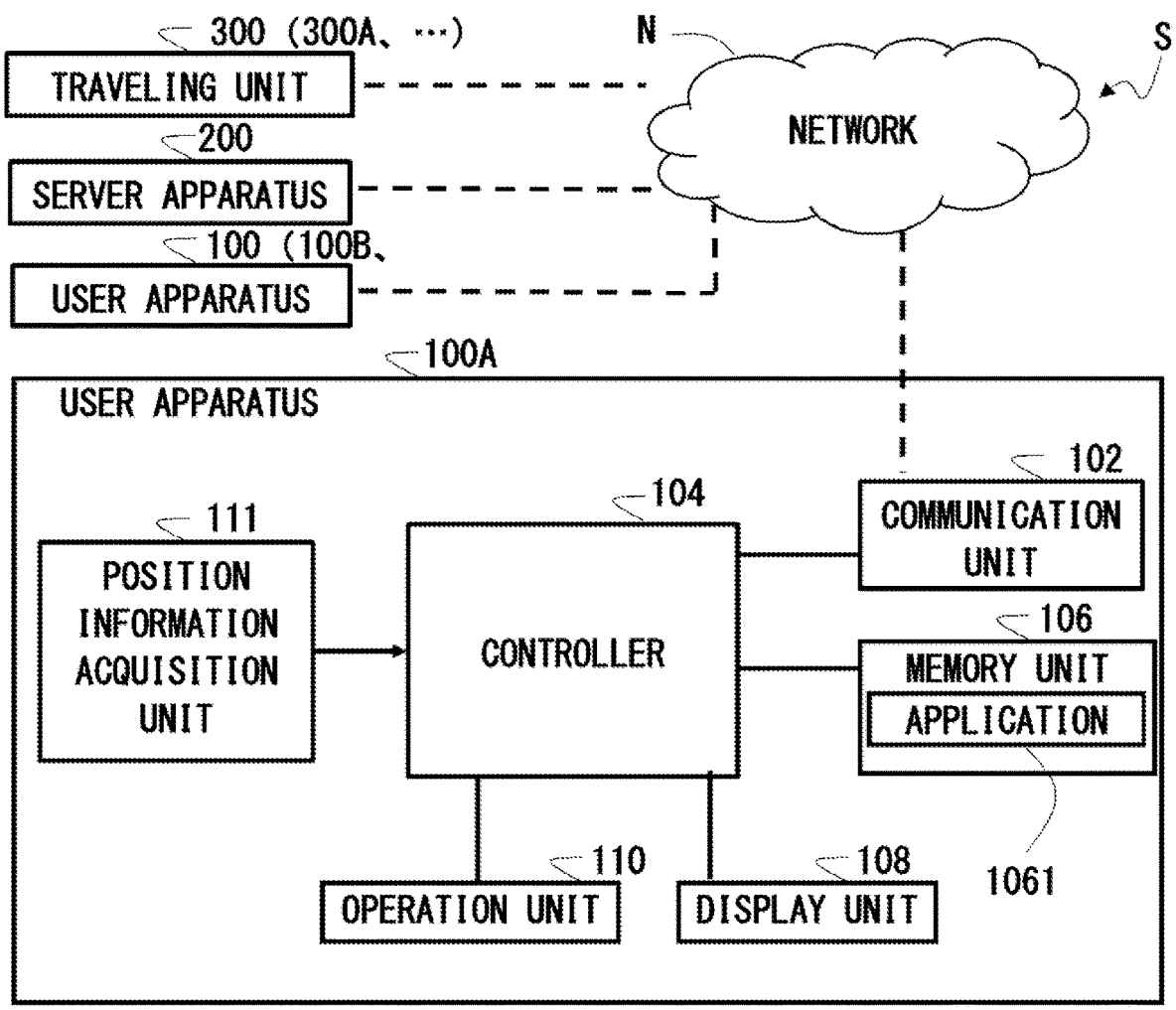
FIG. 4 is a block diagram schematically illustrating the configuration of the system in FIG. 1, the diagram illustrating a configuration of a user apparatus in particular.

Additionally, in FIGS. 2, 3 and 4, the user apparatus 100, the server apparatus 200, and the traveling unit 300 are connected via the same network N. However, such connection may be achieved by a plurality of networks. For example, a network for connecting the user apparatus 100 and the server apparatus 200 and a network for connecting the server apparatus 200 and the traveling unit 300 may be different networks.

Here, a process by the system S including the configuration described above will be described. First, an example of the attribute information of a location that a location provider is able to provide, that is provided by the location provider to the server apparatus 200 via the user apparatus 100 (first apparatus) of the location provider, will be described with reference to FIG. 5. Next, an example of the attribute information of a service that a service provider is able to provide, that is provided by the service provider to the server apparatus 200 via the user apparatus 100 (second apparatus) of the service provider, will be described with reference to FIG. 6. Then, a process by the server apparatus 200 using such pieces of information will be described.

FIG. 5 illustrates a part of the attribute information database Ai1 for locations collecting pieces of attribute information of locations that location providers are able to provide, and illustrates information from the user apparatus 100A of a user A in FIG. 1 and information from a user apparatus 100B of a user B in FIG. 1. When there is a location that a user is able to provide as a location provider, the user performs input from the user apparatus 100 that is associated with the user so as to request for a notification encouraging use of a service that matches the location. When there is a location that a location provider is able to provide, a request for combination with a service that matches the location is possibly issued, for example. Specifically, such a user inputs the attribute information of the location from a screen of the application 1061 of the user apparatus 100, and transmits the same to the server apparatus 200. The attribute information of a location may include information, regarding the location, about at least one of the number of passersby, an area size, a peripheral building, a time slot when provision is possible, a view, and an ambience. Furthermore, the attribute information of the location may include information about the type of service, provision of which at the location is desired. Moreover, the attribute information of the location may include information about a parking-enabled vehicle size of the traveling unit 300 as the autonomous vehicle that provides the service, or an entrance-enabled vehicle size of the traveling unit 300. In this case, as illustrated in FIG. 5, the attribute information of the location is associated with identification information of a user, such as ID-A of the user A or ID-B of the user B. Moreover, the attribute information of the location includes, as elements, identification information of the location, the number of passersby at the location, the area size of the location, a peripheral building, a road around the location (in FIG. 5, "facing road"), the view or the ambience, the time slot when provision is possible, an ambience or sound permitted for the using service, a desired service, and the parking-enabled vehicle size. Additionally, in FIG. 5, as the identification information of a location, a location ID, such as a location 1 or a location 2, for identifying the location is indicated. In this case, the location 1 corresponds to a large parking lot PA of buildings B1, B2 and faces a main street RA, and the location 2 corresponds to a shared parking lot PB of private homes H1, H2 and faces a one-lane road RB. However, a location that a location provider is able to provide is not limited to a parking lot, and may be an event venue, for example.

The "facing road" in FIG. 5 is information indicating a vehicle size that allows an autonomous vehicle to enter the location, and is a width of a road, or a width or a length of the autonomous vehicle, for example. Furthermore, the "parking-enabled vehicle size" is information indicating a vehicle size that allows an autonomous vehicle to be parked, and is an area size of a parking lot, or the width or the length of the autonomous vehicle, for example. In the case where the location is a parking lot, the "parking-enabled vehicle size" is the area size of the parking lot of the location or the size of the autonomous vehicle, and in the case where the location is other than a parking lot, the "parking-enabled vehicle size" is the area size of a parking lot that can be used in relation to the location, and the like. Additionally, in the following processes, each column of the table in FIG. 5 will be referred to as "element" of the attribute information. Furthermore, a first row of the table in FIG. 5 is "attribute name" of each element. Moreover, second and following rows of the table in FIG. 5 are referred to as "attribute value" of each element. In FIG. 5, for example, in relation to the attribute value ID-A, the attribute name of which is user, the attribute value for the attribute name "number of passersby" is "daytime: moderate, nighttime: few".

FIG. 6 illustrates a part of the attribute information database Ai2 for services collecting pieces of attribute information of services that service providers are able to provide, and illustrates information from a user apparatus 100C of a user C in FIG. 1, information from a user apparatus 100D of a user D, and information from a user apparatus 100E of a user E. When there is a service that a user is able to provide as a service provider, the user performs input from the user apparatus 100 that is associated with the user so as to request for a notification encouraging use of a location that matches the service. When there is a service that a service provider is able to provide, a request for combination with a location that matches the service is possibly issued, for example. Specifically, such a user inputs the attribute information of the service from a screen of the application 1061 of the user apparatus 100, and transmits the same to the server apparatus 200. The attribute information of the service may include, as an element, information about at least one of the type of the service, the area size necessary to provide the service, a customer type, a minimum time (minimum provision time) necessary to provide the service, and a time slot (provision time slot) when provision is possible. Furthermore, the attribute information of the service may include, as the element, information about the size of the autonomous vehicle, or in this case, the traveling unit 300, that is necessary to provide the service, or a condition for providing the service by the traveling unit 300. In this case, as illustrated in FIG. 6, the attribute information of a service is associated with identification information of a user, such as ID-C of the user C, ID-D of the user D or ID-E of the user E. Moreover, the attribute information of the service includes, as elements, identification information of the service, the type of the service, the area size of a location that is necessary for provision, the minimum provision time, the provision time slot, the customer type, the size of the traveling unit 300 that is the autonomous vehicle (indicated in FIG. 6 by an element name "size"), and an ambience or sound as the condition for providing the service by the traveling unit 300. Additionally, in FIG. 6, as the identification information of a service, a service ID, such as a service 1, a service 2 or a service 3, for identifying the service is indicated. In this case, the service 1 is associated with the connection unit CUA in FIG. 1, the service 2 is associated with the connection unit CUB, and the service 3 is associated with the connection unit CUC. Additionally, definitions of the element of the attribute information, the attribute name and the attribute value in FIG. 6 are the same as those in FIG. 5.

Additionally, the attribute information of a location in the attribute information database Ai1 for locations in FIG. 5 may include attribute information that is derived by AI determination based on one or a plurality of pieces of attribute information. For example, in the case of the location 1, attribute information indicating that loud volume is allowed may be derived based on pieces of information indicating that the peripheral building is a building and the area size is 40,000 m 2 or more. Furthermore, the server apparatus 200 may acquire an image of a location (such as a 360-degree view image) via the network N, and may analyze the image. Further attribute information may be derived therefrom. Moreover, the server apparatus 200 may collect, from map information and web sites on the Internet, attributes such as a position or an address on the map, the type of shops that exist at the location in large number, a type, a class and the like. The same can be said for the attribute information of a service in the attribute information database Ai2 for services in FIG. 6.

The attribute information database Ai1 for locations as illustrated in FIG. 5 and the attribute information database Ai2 for services as illustrated in FIG. 6 are stored in the memory unit 206 of the server apparatus 200. Here, pieces of attribute information acquired from respective user apparatuses 100 via the information acquisition unit 2041 are stored in the memory unit 206 by the user management unit 2043.

Figure 7:
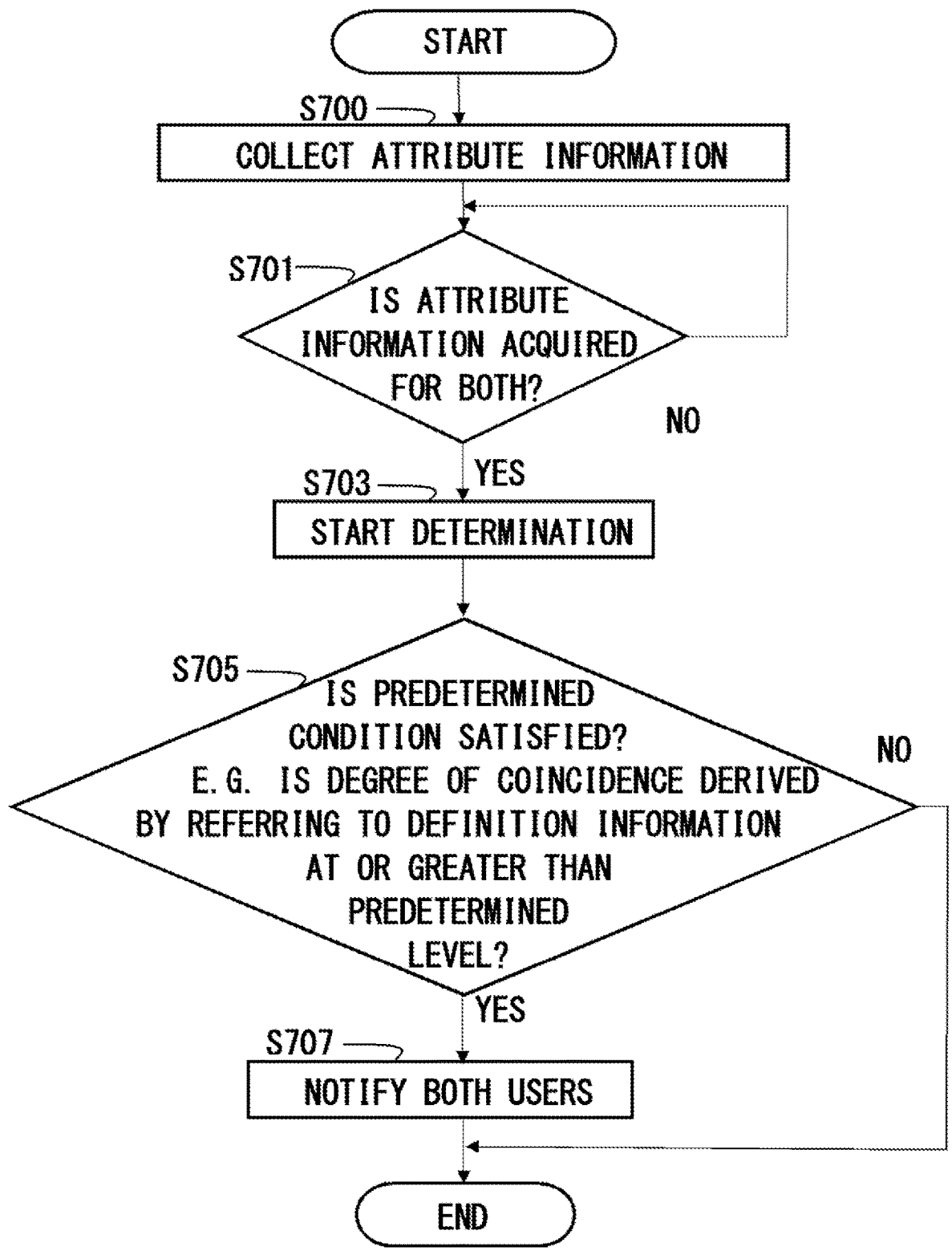
FIG. 7 is a flowchart of control by the server apparatus.

An example of a process by the server apparatus 200 in the system S in such a state will be described with reference to FIG. 7.

The controller 204 of the server apparatus 200 collects the attribute information of a location and the attribute information of a service (S700). Additionally, the process in S700 may be performed an independent process in parallel with a process in S701 and subsequent processes in FIG. 7.

Of the controller 204 of the server apparatus 200, the processing start unit 2045 of the matching processing unit 2044 reads data in the memory unit 206 at regular or irregular intervals. For example, "at irregular intervals" means when an event indicating update of the data in the memory unit 206 is detected by the processing start unit 2045. Then, when at least one each of the attribute information of a location and the attribute information of a service are acquired (positive determination in step S701), the processing start unit 2045 transmits an operation signal to the match determination unit 2046. Accordingly, in the process in FIG. 7, acquisition of the attribute information of a location may be said to include collection, by the process in S700, from the apparatuses of a plurality of location providers, of the attribute information of a location that each location provider is able to provide. Furthermore, in the process in FIG. 7, acquisition of the attribute information of a service may be said to include collection, by the process in S700, from the apparatuses of a plurality of service providers, of the attribute information of a service that each service provider is able to provide. Then, the match determination unit 2046 of the matching processing unit 2044 starts determination of whether or not each combination of the attribute information of a location and the attribute information of a service satisfies a predetermined condition (step S703). Here, the predetermined condition is defined as including a degree of coincidence at or greater than a predetermined level.

In the present embodiment, the degree of coincidence is determined based on coincidence between attribute names and coincidence between attribute values corresponding to the attribute names. Whether or not the attribute names coincide between a location and a service is evaluated by referring to definition information defining the degree of coincidence between elements of pieces of attribute information, such as a conversion table or a dictionary of synonyms. Then, in the case where an evaluation value that is a result of evaluation is at or greater than a predetermined value, determination of attribute values is determined to be possible for the element of the attribute information of the location and the element of the attribute information of the service, and the degree of coincidence is determined for the attribute values.

Also with respect to the degree of coincidence between attribute values, the degree of coincidence or the degree of match is evaluated in scores by referring to, for each attribute value, definition information defining the degree of coincidence between attribute values, such as a conversion table or a dictionary of synonyms, and evaluation is performed by the total of such scores. For example, a combination may be created from an element of the attribute information of the location and an element of the attribute information of the service, determination of attribute values of which are determined to be possible, and the total may be obtained for the combination. Additionally, in relation to the element in FIG. 5 whose attribute name is "number of passersby", the attribute value includes a plurality of values, namely, "daytime: moderate" and "nighttime: few". To determine the degree of coincidence for the attribute value of an element including a plurality of values, a value including a higher degree of coincidence with the attribute value of the counterpart element with which the degree of coincidence is to be determined may be selected, or determination may be performed using a total value of the degrees of coincidence of both values. The same can be said for when there are three or more attribute values. Furthermore, in the case where the element of the attribute information of a location and the element of the attribute information of a service both include a plurality of attribute values, a set of attribute values with the highest degree of coincidence among combinations of attribute values may be selected, or determination may be performed selecting at least one set where the degree of coincidence is at or greater than a predetermined value and by using a total value of the selected set(s).

However, a predetermined number of sets of an element of the attribute information of a location and an element of the attribute information of a service may be determined in advance. For example, "desired service" in the attribute information of a location and "type" in the attribute information of a service are taken as a set. Furthermore, for example, "area size" in the attribute information of a location and "necessary area size" in the attribute information of a service are taken as a set. Then, a total of the degrees of coincidence may be determined for only the sets set in advance. Here, the degree of coincidence at or greater than a predetermined level is determined when the total of scores is at or greater than a threshold.

However, the match determination unit 2046 may evaluate the degree of coincidence by using other methods or means. For example, the elements of each piece of attribute information may be classified into categories by artificial intelligence (AI), and the degree of coincidence may be evaluated for each classified category. Then, as in the case described above, a combination may be created from an element of the attribute information of a location and an element of the attribute information of a service, determination of attribute values of which are determined to be possible. Then, a combination of a location and a service for which the total is at or greater than a predetermined value is determined to include a degree of coincidence at or greater than a predetermined level. A combination of a location and a service is a combination of one of locations in second and following rows in FIG. 5 and one of services in second and following rows in FIG. 6.

When there is a combination for which the degree of coincidence at or greater than a predetermined level, the match determination unit 2046 outputs, as the combination that satisfies the predetermined condition, the combination of the attribute information of the location and the attribute information of the service, or in other words, the combination of the location and the service (positive determination in step S705). On the other hand, when there is no combination for which the degree of coincidence is at or greater than a predetermined level, the match determination unit 2046 determines that there is no combination of a location and a service that satisfies the predetermined condition (negative determination in step S705), and the routine is ended.

When there is a combination that satisfies the predetermined condition (positive determination in step S705), the match determination unit 2046 transmits the result to the proposal notification unit 2047. The proposal notification unit 2047 issues a notification to the effect to the two user apparatuses 100 of the combination satisfying the predetermined condition. Specifically, it is assumed that the degree of coincidence is determined to be at or greater than a predetermined level for the combination of the location 1 in FIG. 5 that the user A is able to provide and the service 1 in FIG. 6 that the user C is able to provide. At this time, the proposal notification unit 2047 transmits, to the user apparatus 100A of the user A, a notification encouraging rental of the location 1 to the user C, to promote use of the service of the user C. Furthermore, the proposal notification unit 2047 transmits, to the user apparatus 100C of the user C, a notification encouraging use of the location 1 of the user A (step S707). Transmission of this notification is performed via the information provision unit 2051. Additionally, the proposal notification unit 2047 may transmit at least one of the notification to the user apparatus 100A of the user A and the notification to the user apparatus 100C of the user C.

The information provision unit 2051 thus supports the users A and C in recognizing each other. Furthermore, the information provision unit 2051 may cause the users A and C to view the location or the service, use of which is encouraged, via the application 1061 of the respective user apparatuses 100, and may support negotiation between the users. Then, when using the location or the service, use of which is encouraged, each user A, C replies, through the application 1061 of the user apparatus 100, to the effect that the user consents to use the counterpart's land or service. Here, use of the service of the user C by the user A normally means rental of the location 1 of the user A to the user C to thereby make good use of the location 1 of the user A. In this case, the service of the user C is provided at the location 1 of the user A to a third party other than the user A to make good use of the location 1 of the user A. However, the user A himself/herself may also enjoy the service from the user C at the location 1 of the user A. For example, content of the negotiation mentioned above may be that the user C gives a 3-hour musical performance at the location 1 of the user A on predetermined date and time. Such a response is acquired by the response processing unit 2048 of the matching processing unit 2044. Then, when a response of consent is acquired from the user apparatuses 100 of both users A and C, the response processing unit 2048 of the matching processing unit 2044 transmits the same to the match establishing unit 2049 of the matching processing unit 2044. The match establishing unit 2049 then refers to the vehicle information database 2061, selects the traveling unit 300A and the connection unit CUA matching the consented content (service 1) as the autonomous vehicle, and transmits the information to the command creation unit 2050. Additionally, the connection unit CUA is a unit that can function as a stage for a musical performance. Moreover, the match establishing unit 2049 transmits a notification indicating establishment to both the user apparatus 100A of the user A, who is the location provider, and the user apparatus 100C of the user C, who is the service provider.

The command creation unit 2050 then creates an operation command including the travel plan based on the established content. The operation command includes information such as connection of the connection unit CUA to the traveling unit 300A. Then, the information provision unit 2051 transmits the operation command created by the command creation unit 2050 to the traveling unit 300A.

Next, acquisition of a request for the matching process from the user apparatus 100, by the controller 204 of the server apparatus 200, will be described with reference to a flowchart in FIG. 8.

For example, description will be given of a case where the user B requests, via the user apparatus 100B, for a notification encouraging use of a service matching the location 2 of the user B, and where the processing start unit 2045 of the matching processing unit 2044 in the controller 204 of the server apparatus 200 acquires the request. At this time, because there is a request from the user B who is a location provider (positive determination in step S801), the processing start unit 2045 transmits the request from the user B regarding the location 2 to the match determination unit 2046 of the matching processing unit 2044. Then, the match determination unit 2046 accesses the attribute information database Ai1 for locations in the memory unit 206, and acquires the attribute information of the location 2 of the user B as first attribute information (step S803). Then, the match determination unit 2046 accesses the attribute information database Ai2 for services in the memory unit 206, and acquires the attribute information of a service as second attribute information (step S805). The match determination unit 2046 then starts determination (step S807). The process of determination is as described with reference to steps S703 and S705.

Then, when there is one or a plurality of combinations that satisfy the predetermined condition (positive determination in step S809), the combination(s) is/are transmitted to the proposal notification unit 2047. On the other hand, when there is no attribute information of a service that satisfies the predetermined condition with the attribute information of the location 2 (negative determination in step S809), a notification that there is no matching service is transmitted to the user apparatus 100B of the user B who issued the request (step S811). In this case, because there is no service that matches the location 2, the routine is ended.

When there is a plurality of combinations that satisfy the predetermined condition (positive determination in step S809), the proposal notification unit 2047 selects the service of the attribute information with the highest degree of coincidence among the plurality of combinations. For example, according to FIG. 5, the desired service for the location 2 of the user B is "meal", "healthcare" or "retail". For example, services with high degrees of coincidence with such services and high degrees of coincidence with the location 2 of the user B in teams of the area size and the time slot are determined. For example, in this case, the service 2, "food retail", of the user D and the service 3, "pet trimming", of the user E are determined to be services of the attribute information including degrees of coincidence at or greater than a predetermined level (positive determination in step S809). In this case, of these services, the service including a higher degree of coincidence with the service desired for the location 2 of the user B is the service 2, "food retail", of the user D, for example. Accordingly, at this time, the service 2 is selected as the service of the attribute information including the highest degree of coincidence with the attribute information of the location 2. Then, a notification encouraging use of the service 2, "food retail", of the user D is transmitted to the user apparatus 100B of the user B who requested for the matching process (step S813).

As a result, the user B may transmit a response regarding the service 2, use of which is encouraged, to the server apparatus 200 via the user apparatus 100B. In the case where the response from the user B indicates a wish to use the service 2 (rental of the location 2 to the user D) (positive determination in step S815), the response processing unit 2048 acquiring the response transmits a notification encouraging use of the location 2 of the user B to the user apparatus 100D of the user D (step S817). Transmission of this notification is performed via the information provision unit 2051. As described with reference to FIG. 7, the users B and D are thus enabled to perform negotiation.

On the other hand, in the case where the response from the user B is a response indicating that use of the service 2 is not desired (negative determination in step S815), the response processing unit 2048 acquiring the response from the user B determines whether there is a remaining combination (step S819). In this case, there is still the service 3 of the user E (positive determination in step S819), and then, a notification encouraging use of the service 3 of the attribute information with the next highest degree of coincidence (rental of the location 2 to the user E) is transmitted to the user apparatus 100B of the user B (step S813). On the other hand, in the case where there is no remaining combination (negative determination in step S819), the response processing unit 2048 transmits a notification indicating that there is no matching service to the user apparatus 100B of the user B who issued the request (step S811). The routine is then ended.

Figure 8:
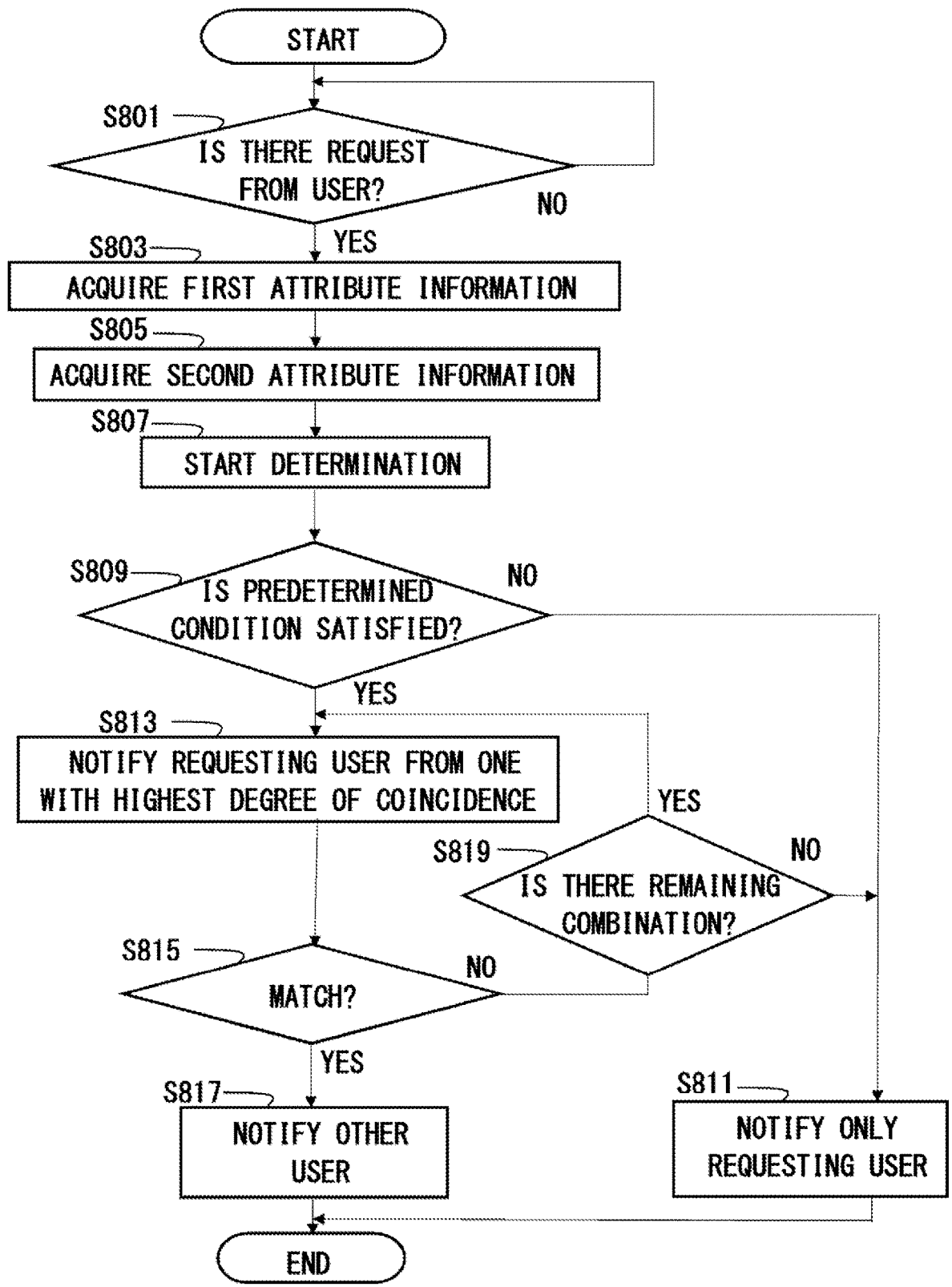
FIG. 8 is a flowchart of further control by the server apparatus.

Additionally, in the description of FIG. 8 given above, the user who transmits the request for the matching process is the user B as the location provider. However, the service provider may also transmit the request for the matching process. For example, when the user D as the service provider requests for a notification encouraging use of a location in relation to the service 2, the attribute information of the service 2 is acquired, as the first attribute information, from the attribute information database Ai2 for services in FIG. 6 (step S805). Then, the attribute information of a location in the attribute information database Ai1 for locations in FIG. 5 is acquired as the second attribute information (step S807). Then, whether or not there is the attribute information of a location that satisfies the predetermined condition with the attribute information of the service 2 is determined (step S809). When there is the attribute information of a location that satisfies the predetermined condition, and in the case where the location is the location 2 of the user B (positive determination in step S809), for example, a notification encouraging use of the location 2 is transmitted to the user apparatus 100D of the user D who issued the request for the matching process (step S813). The process as described above is then performed.

Furthermore, from various points of view, determination of whether or not the attribute information of a location and the attribute information of a service satisfy the predetermined condition may be performed by various methods or means. The attribute information of a service may include the size of the autonomous vehicle that is necessary to provide the service or a condition for providing the service by the autonomous vehicle, and the attribute information of a location may include the parking-enabled size of an autonomous vehicle or the entrance-enabled size of an autonomous vehicle. For example, brief description will be given for when the user C as the service provider requests for a notification encouraging use of a location in relation to the service 1, or in other words, when the user C requests for the matching process. In this case, the size of the vehicle to be used for the service 1 is "large". Accordingly, the location 2 with a narrow facing road may be determined not to satisfy the predetermined condition, and the location 1 with a wide road may be determined to satisfy the predetermined condition.

As described above, in the process by the server apparatus 200 of the system S of the embodiment described above, the controller 204 acquires, from the user apparatus of the location provider, the attribute information of the location that the location provider is able to provide. Furthermore, the controller 204 acquires, from the apparatus of the service provider, the attribute information of the service that the service provider is able to provide. Then, when the attribute information of the location and the attribute information of the service satisfy the predetermined condition, the controller 204 transmits a notification encouraging rental of the location to the service provider, to the user apparatus of the location provider. The controller 204 may also transmit a notification encouraging use of the location, to the user apparatus of the service provider. That is, the controller 204 performs at least one of notification to the user apparatus of the location provider and notification to the user apparatus of the service provider. Accordingly, provision of a service according to a location or provision of a location according to a service may be more appropriately encouraged.

The embodiment described above is merely an example, and the present disclosure may be changed as appropriate within the scope of the disclosure. The processes and/or units described in the present disclosure may be implemented partially or by being freely combined to the extent that no technical conflicts exist.

Furthermore, a process that is described to be performed by one apparatus may be shared and performed by a plurality of apparatuses. For example, the server apparatus 200 as an information processing apparatus and/or the information processing apparatus 302 of the traveling unit 300 does not have to be one computer but may be configured as a system that includes a plurality of computers. Alternatively, processes described to be performed by different apparatuses may be performed by one apparatus. Which function is to be implemented by which hardware configuration in a computer system may be flexibly changed.

The present disclosure may also be implemented by supplying computer programs for implementing the functions described in the embodiment described above to a computer, and by one or more processors of the computer reading out and executing the programs. Such computer programs may be provided to the computer by a non-transitory computer-readable storage medium that can be connected to a system bus of the computer, or may be provided to the computer via a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read only memories (ROMs), random access memories (RAMS), EPROMs, EEPROMs, magnetic cards, flash memories, optical cards, and any type of medium suitable for storing electronic instructions.

What is claimed is:

1. An information processing apparatus comprising a controller including at least one processor configured to execute:
    acquiring, from an apparatus of a location provider, attribute information of a location that the location provider is able to provide;
    acquiring, from an apparatus of a service provider, attribute information of a service that the service provider is able to provide; and
    performing, transmission, to the apparatus of the location provider, of a first notification encouraging rental of the location to the service provider and transmission, to the apparatus of the service provider, of a second notification encouraging use of the location, when the attribute information of the location and the attribute information of the service satisfy a predetermined condition, wherein:
    the service is provided using an autonomous vehicle,
    the attribute information of the location includes information about a parking-enabled vehicle size of the autonomous vehicle or an entrance-enabled vehicle size of the autonomous vehicle, and
    the attribute information of the service includes information about a size of the autonomous vehicle that is necessary to provide the service, and
    the controller:
        determines whether or not the parking-enabled vehicle size of the autonomous vehicle or the entrance-enabled vehicle size of the autonomous vehicle included in the attribute information of the location is larger than the size of the autonomous vehicle that is necessary to provide the service included in the attribute information of the service;
        transmits the first notification to the apparatus of the location provider and transmits the second notification to the apparatus of the service provider in a case where the parking-enabled vehicle size of the autonomous vehicle or the entrance-enabled vehicle size of the autonomous vehicle is larger than the size of the autonomous vehicle that is necessary to provide the service;
        selects an autonomous vehicle providing the service on the service provider in a case where the controller receives a first response of consent on rental of the location to the service provider from the apparatus of the location provider which received the first notification and receives a second response of consent on use of the location from the apparatus of the service provider which received the second notification;
        transmits a notification of establishment that a combination of the location that is able to be provided by the location provider and the service that is able to be provided by the service provider is established to both the apparatus of the location provider which transmitted the first response and the apparatus of the service provider which transmitted the second response;
        creates an operation command including a travel plan of the selected autonomous vehicle based on the establishment;
        transmits the created operation command to the selected autonomous vehicle; and
        controls the selected autonomous vehicle to travel according to the transmitted operation command.

2. The information processing apparatus according to claim 1, wherein the attribute information of the location includes information, regarding the location, about at least one of number of passersby, an area size, a peripheral building, a time slot when provision is possible, a view, and an ambience.

3. The information processing apparatus according to claim 1, wherein the attribute information of the location includes information about a type of service, provision of which is desired by the location provider.

4. The information processing apparatus according to claim 1, wherein the attribute information of the service includes information about at least one of a type of the service, an area size that is necessary to provide the service, a customer type, a minimum provision time, and a time slot when provision is possible.

5. The information processing apparatus according to claim 1, wherein
    acquisition of the attribute information of the location includes collecting, from apparatuses of a plurality of the location providers, the attribute information of a location that each location provider is able to provide,
    acquisition of the attribute information of the service includes collecting, from apparatuses of a plurality of the service providers, the attribute information of a service that each service provider is able to provide, the controller is further configured to refer to definition information defining a degree of coincidence between the attribute information of the location and the attribute information of the service, for each of combinations of the attribute information of the location that is collected and the attribute information of the service that is collected, and the predetermined condition is that the degree of coincidence is highest.

6. The information processing apparatus according to claim 1, wherein transmission, to the apparatus of the location provider, of the first notification encouraging rental of the location to the service provider is performed in response to a request from the service provider, the request being for combination with a location regarding the service that is provided by the service provider.

7. The information processing apparatus according to claim 1, wherein transmission, to the apparatus of the service provider, of the second notification encouraging use of the location is performed in response to a request from the location provider, the request being for combination with a service regarding the location that is provided by the location provider.

8. An information processing method performed by at least one computer, the method comprising:
   acquiring, from an apparatus of a location provider, attribute information of a location that the location provider is able to provide;
   acquiring, from an apparatus of a service provider, attribute information of a service that the service provider is able to provide; and
   performing, transmission, to the apparatus of the location provider, of a first notification encouraging rental of the location to the service provider and transmission, to the apparatus of the service provider, of a second notification encouraging use of the location, when the attribute information of the location and the attribute information of the service satisfy a predetermined condition, wherein:
   the service is provided using an autonomous vehicle,
   the attribute information of the location includes information about a parking-enabled vehicle size of the autonomous vehicle or an entrance-enabled vehicle size of the autonomous vehicle, and
   the attribute information of the service includes information about a size of the autonomous vehicle that is necessary to provide the service, and
   the method further comprises:
   determining whether or not the parking-enabled vehicle size of the autonomous vehicle or the entrance-enabled vehicle size of the autonomous vehicle included in the attribute information of the location is larger than the size of the autonomous vehicle that is necessary to provide the service included in the attribute information of the service;
   transmitting the first notification to the apparatus of the location provider and transmitting the second notification to the apparatus of the service provider in a case where the parking-enabled vehicle size of the autonomous vehicle or the entrance-enabled vehicle size of the autonomous vehicle is larger than the size of the autonomous vehicle that is necessary to provide the service;
   selecting an autonomous vehicle providing the service on the service provider upon receiving a first response of consent on rental of the location to the service provider from the apparatus of the location provider which received the first notification and receiving a second response of consent on use of the location from the apparatus of the service provider which received the second notification;
   transmitting a notification of establishment that a combination of the location that is able to be provided by the location provider and the service that is able to be provided by the service provider is established to both the apparatus of the location provider which transmitted the first response and the apparatus of the service provider which transmitted the second response;
   creating an operation command including a travel plan of the selected autonomous vehicle based on the establishment;
   transmitting the created operation command to the selected autonomous vehicle; and
   controlling the selected autonomous vehicle to travel according to the transmitted operation command.

9. The information processing method according to claim 8, wherein the attribute information of the location includes information, regarding the location, about at least one of number of passersby, an area size, a peripheral building, a time slot when provision is possible, a view, and an ambience.

10. The information processing method according to claim 8, wherein the attribute information of the location includes information about a type of service, provision of which is desired by the location provider.

11. The information processing method according to claim 8, wherein the attribute information of the service includes information about at least one of a type of the service, an area size that is necessary to provide the service, a customer type, a minimum provision time, and a time slot when provision is possible.

12. The information processing method according to claim 8, wherein
   the at least one computer further refers to definition information defining a degree of coincidence between the attribute information of the location and the attribute information of the service, for each of combinations of the attribute information of the location and the attribute information of the service, and
   the predetermined condition is that the degree of coincidence is highest.

13. The information processing method according to claim 8, wherein transmission, to the apparatus of the location provider, of the first notification encouraging rental of the location to the service provider is performed in response to a request from the service provider, the request being for combination with a location regarding the service that is provided by the service provider.

14. The information processing method according to claim 8, wherein transmission, to the apparatus of the service provider, of the second notification encouraging use of the location is performed in response to a request from the location provider, the request being for combination with a service regarding the location that is provided by the location provider.

15. A system comprising a first apparatus of a location provider, a second apparatus of a service provider, and an information processing apparatus capable of communicating with the first apparatus and the second apparatus, wherein
   the information processing apparatus includes a controller configured to execute:

acquiring, from the first apparatus, attribute information of a location that the location provider is able to provide;

acquiring, from the second apparatus, attribute information of a service that the service provider is able to provide; and performing, transmission, to the first apparatus of the location provider, of a first notification encouraging rental of the location to the service provider and transmission, to the second apparatus of the service provider, of a second notification encouraging use of the location, when the attribute information of the location and the attribute information of the service satisfy a predetermined condition, wherein:

the service is provided using an autonomous vehicle, the attribute information of the location includes information about a parking-enabled vehicle size of the autonomous vehicle or an entrance-enabled vehicle size of the autonomous vehicle, and the attribute information of the service includes information about a size of the autonomous vehicle that is necessary to provide the service, and the controller:

determines whether or not the parking-enabled vehicle size of the autonomous vehicle or the entrance-enabled vehicle size of the autonomous vehicle included in the attribute information of the location is larger than the size of the autonomous vehicle that is necessary to provide the service included in the attribute information of the service;

transmits the first notification to the first apparatus and transmits the second notification to the second apparatus in a case where the parking-enabled vehicle size of the autonomous vehicle or the entrance-enabled vehicle size of the autonomous vehicle is larger than the size of the autonomous vehicle that is necessary to provide the service;

selects an autonomous vehicle providing the service on the service provider in a case where the controller receives a first response of consent on rental of the location to the service provider from the first apparatus which received the first notification and receives a second response of consent on use of the location from the second apparatus which received the second notification;

transmits a notification of establishment that a combination of the location that is able to be provided by the location provider and the service that is able to be provided by the service provider is established to both the first apparatus which transmitted the first response and the second apparatus which transmitted the second response;

creates an operation command including a travel plan of the selected autonomous vehicle based on the establishment;

transmits the created operation command to the selected autonomous vehicle; and controls the selected autonomous vehicle to travel according to the transmitted operation command.

16. The system according to claim 15, wherein the attribute information of the location includes information, regarding the location, about at least one of number of passersby, an area size, a peripheral building, a time slot when provision is possible, a view, and an ambience.

17. The system according to claim 15, wherein the attribute information of the location includes information about a type of service, provision of which is desired by the location provider.

18. The system according to claim 15, wherein the attribute information of the service includes information about at least one of a type of the service, an area size that is necessary to provide the service, a customer type, a minimum provision time, and a time slot when provision is possible.

* * * * *